(12) United States Patent
Cote et al.

(10) Patent No.: US 12,130,940 B2
(45) Date of Patent: Oct. 29, 2024

(54) SYSTEM AND METHOD TO PERMANENTLY ERASE CUSTOMER PERSONAL INFORMATION FROM MOBILE DEVICE

(71) Applicant: Communications Test Design, Inc., West Chester, PA (US)

(72) Inventors: Christian Cote, Philadelphia, PA (US); Nidhin Davis, Glen Mills, PA (US)

(73) Assignee: Communications Test Design, Inc., West Chester, PA (US)

( * ) Notice: Subject to any disclaimer, the term of this patent is extended or adjusted under 35 U.S.C. 154(b) by 247 days.

(21) Appl. No.: 17/819,829

(22) Filed: Aug. 15, 2022

(65) Prior Publication Data

US 2024/0054244 A1 Feb. 15, 2024

(51) Int. Cl.
*G06F 21/62* (2013.01)
*G05B 19/4155* (2006.01)
*G06T 7/00* (2017.01)

(52) U.S. Cl.
CPC ..... *G06F 21/6245* (2013.01); *G05B 19/4155* (2013.01); *G06T 7/0004* (2013.01); *G05B 2219/33099* (2013.01); *G06F 2221/2143* (2013.01)

(58) Field of Classification Search
CPC .................................................. G06T 7/0004
See application file for complete search history.

(56) References Cited

U.S. PATENT DOCUMENTS

| | | | |
|---|---|---|---|
| 11,113,415 | B1 | 9/2021 | Amico |
| 2016/0350756 | A1* | 12/2016 | Shepard ............... G06Q 20/047 |
| 2018/0150047 | A1 | 5/2018 | Shapiro |
| 2021/0067957 | A1* | 3/2021 | Parsons ................. G06F 16/162 |
| 2022/0067672 | A1* | 3/2022 | Li .......................... B07C 5/3422 |
| 2022/0097305 | A1 | 3/2022 | Erickson et al. |

OTHER PUBLICATIONS

International Search Report and Written Opinion issued for PCT Application No. PCT/US2023/025990 issued Sep. 27, 2023.

* cited by examiner

*Primary Examiner* — Clayton R Williams
(74) *Attorney, Agent, or Firm* — Duane Morris LLP

(57) ABSTRACT

A system to physically remove data including customer personal information from mobile devices includes a computer; an input device to input to the computer a unique identifier associated with a board; a computer numerical control (CNC) machine controlled by the computer and configured to physically remove a predetermined chip from the board; a camera to record the CNC machine physically removing the predetermined chip from the board; and a memory to store a first file comprising the camera's recording and to store a second file comprising a record associating the unique identifier associated with the board to the camera's recording.

6 Claims, 2 Drawing Sheets

SYSTEM AND METHOD TO PERMANENTLY ERASE CUSTOMER PERSONAL INFORMATION FROM MOBILE DEVICE

FIELD

The present disclosure relates to a system and method to remove data, and more specifically, to a system and method to physically remove data including customer personal information from mobile devices.

BACKGROUND

Mobile devices, including tablets and smartphones, have become sophisticated, widespread, and pervasive. With the increasing usage of computer network services all over the world, these mobile devices are in great demand. As a result, the cost of returned, used, and refurbished mobile devices has increased. As with any used mobile device, the customer data or customer personal information (CPI) on the used mobile device needs to be erased, deleted, or wiped from memory during refurbishment and before resale of the mobile device or components because of privacy and personal security concerns. Customer data or CPI can include files, digital images, applications, passwords, text messages, emails, contacts, etc. As the number of used mobile devices increases, and the data on the used mobile devices increases, removing customer data of various mobile devices is not only complicated, but also time consuming and expensive.

Conventionally, CPI is removed from mobile devices using software or physical destruction. Software-based erasure, which can include cryptographic "secure erase" and other techniques or programs, removes or makes data on a memory or storage device unreadable. However, a working mobile device is required for software erasure to be successful.

When a mobile device cannot be turned on or is not functioning properly, CPI cannot be erased through conventional means using software. Yet, the information can remain within memory on the electronic circuit board (i.e., logic board or motherboard) and could theoretically be recovered by a bad actor using specialized forensic tools. To ensure there is no CPI remaining on the mobile device, mechanical destruction may be necessary. In high volume operations, this can include physically shredding the mobile device or in some cases by shredding just the logic board. Mechanical destruction methods are wasteful because more components than necessary are physically rendered unusable, creating excess waste, and do not target the root of the problem, the memory.

SUMMARY

The disclosed system and method includes tracking unique identification number and video recording to provide documented traceability of the CPI removal process for audit/review purposes for a mobile device while maximizing the component reuse and ensuring CPI is 100% eliminated in a non-recoverable way.

The above-described embodiments of the present disclosure can be implemented in any of numerous ways. For example, the embodiments can be implemented using hardware, software, or a combination thereof. When implemented in software, the software code can be executed on any suitable computer, processor, or collection of processors, whether provided in a single computer or distributed among multiple computers. Such processors can be implemented as integrated circuits, with one or more processors in an integrated circuit component. Though, a processor can be implemented using circuitry in any suitable format.

Additionally, or alternatively, the above-described embodiments can be implemented as a non-transitory computer readable storage medium embodied thereon a program executable by a processor that performs a method of various embodiments.

Also, the various methods, processes, or steps outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically, the functionality of the program modules can be combined or distributed as desired in various embodiments.

To overcome the problems described above, one embodiment of the present disclosure is a system to physically remove data including customer personal information from mobile devices includes a computer; an input device to input to the computer a unique identifier associated with a board; a computer numerical control (CNC) machine controlled by the computer and configured to physically remove a predetermined chip from the board; a camera to record the CNC machine physically removing the predetermined chip from the board; and a memory to store a first file comprising the camera's recording and to store a second file comprising a record associating the unique identifier associated with the board to the camera's recording.

In an aspect, the input device is a bar code scanner.

In an aspect, the unique identifier is of a mobile device and the board is from the mobile device.

In an aspect, the unique identifier is an International Mobile Equipment Identity (IMEI) number of a mobile device.

In an aspect, the chip is a memory chip. In an aspect, the chip has stored customer personal information.

In another embodiment of the present disclosure, a method includes recording a unique identifier of a mobile device; storing a recording of an operation that physically destroys a memory chip from the mobile device; and storing a record associating the unique identifier to the recording of the operation.

In an aspect, the recording the unique identifier of the mobile device is performed by scanning an International Mobile Equipment Identity (IMEI) number of the mobile device and storing the unique identifier in a computer memory.

In an aspect, the operation that physically destroys the memory chip from the mobile device is performed by a computer numerical control (CNC) machine.

In an aspect, the recording of the operation that physically destroys a memory chip from the mobile device is performed by a video camera.

In an aspect, the operation that physically destroys the memory chip from the mobile device is stored in a memory.

In an aspect, the memory chip is on a logic board that has been removed from the mobile device. In an aspect, the memory chip has stored customer personal information.

In an aspect, the record associating the unique identifier to the recording of the operation is stored in a memory.

In an aspect, components of the mobile device are salvageable after the memory chip is destroyed.

The method can further include failing to erase customer personal information from the memory chip prior to performing the operation that physically destroys the memory chip from the mobile device.

In another embodiment of the present disclosure, a computer-readable storage medium includes computer-executable instructions stored tangibly thereon, the instructions when executed causing a processor to perform the operations of: recording a unique identifier of a mobile device; storing a recording of an operation that physically destroys a memory chip from the mobile device; and storing a record associating the unique identifier to the recording of the operation.

The above and other features, elements, characteristics, steps, and advantages of the present invention will become more apparent from the following detailed description of preferred embodiments of the present invention with reference to the attached drawings.

DETAILED DESCRIPTION

Figure 1:
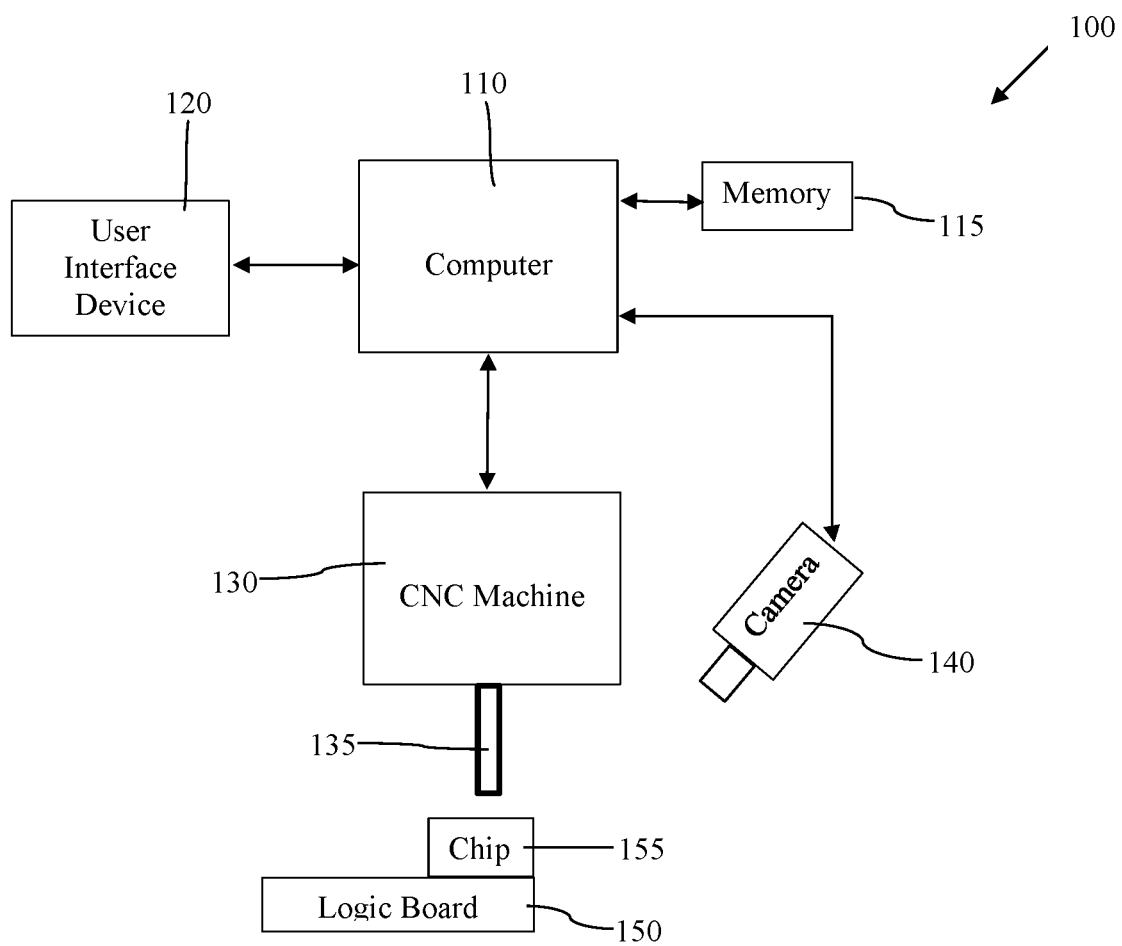
FIG. 1 is a diagram of a system according to an embodiment of the present disclosure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Also, the embodiments of the present disclosure can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

The disclosed system and method provides a targeted way to eliminate CPI while minimizing waste and maximizing the possible reuse of components. Unlike wholesale shredding, only the memory storage device is destroyed. Unlike a desoldering process that removes the storage device from the logic board, the disclosed process does not require multiple steps (e.g., desoldering in one machine, reprogramming in another), and effectively eliminates CPI on 100% of devices, even if the mobile device or logic board is damaged. Once the memory chip is removed by desoldering, the memory chip can either be destroyed or erased using a chip programmer. However, tight tolerances around the memory chip could prevent desoldering on some logic boards. Also, heat from desoldering could affect other components on the logic board, reducing the opportunity for salvage. The multi-step desoldering process further complicates the generation of an auditable trail to confirm the CPI for a given mobile device was destroyed.

On the other hand, the disclosed method works on most logic boards. The disclosed solution is suitable for a production environment and provides traceability with an audit trail by recording (i) a unique identifier (e.g., international mobile equipment identity (IMEI) number) associated with the mobile device, and (ii) video of the destruction of the mobile device's memory storage device.

To salvage any component from a defective mobile device during a manufacturer's or provider's sanctioned refurbishment process, it has to be demonstrated that CPI has been removed from the mobile device. In some cases, evidence of removal has to retained for a period of years (e.g., 3 years). In most cases, removal of CPI can be accomplished through software erasure, and the traceability evidence/audit trail can include status in a shop floor system program, log, or other recording means.

However, when a mobile device is not functional, CPI removal cannot be performed through software means and must be done mechanically. To salvage any other working components from the mobile device (i.e., display, camera, housing, buttons, logic board, etc.) and meet manufacturer or provider sanctioned requirements, proof that the memory storage element was destroyed is required.

The disclosed system and method solves the problem by physically destroying the main storage device (memory chip) using a high precision computerized numerical control (CNC) machine to mill, grind, or route away the memory chip from the logic board. This renders any data present on the memory chip unrecoverable by any means. In most cases, the remainder of the logic board is unaffected and can be repaired or used to salvage other components. Eliminating the memory chip in this way helps safeguard customer privacy and permits possible reuse of components from the mobile device without any risk of exposing CPI.

To provide evidence of memory chip destruction, the method can include recording a unique identifier (e.g., IMEI, serial number, etc.) of the mobile device and a video capturing the memory chip being milled away. For example, a software interface can be used by an operator to scan the unique identifier of the mobile device and tie the video recording to that specific mobile device record in a memory. This ensures that traceability evidence and an audit trail is available for the CPI removal from that mobile device.

FIG. 1 is a block diagram illustrating an exemplary CPI removal system 100 to remove CPI data from a mobile device according to the present disclosure. As shown, the CPI removal system 100 can include a computer 110, a user interface device 120 to interface with the computer 110, a CNC machine 130 interfaced to the computer 110, and a camera 140 interfaced to the computer.

The computer 110 can be a single computer or network of computers including a memory 115 that is capable of storing application programs and data. The computer 110 is configured to run application programs that accept user input, control the CNC machine 130, control the camera 140, and store application programs and data in the memory 115. The computer 110 can run a custom software application with a graphical user interface (GUI) to allow the operator to complete the following tasks: (i) input or scan the mobile device unique identifier (IMEI); (ii) optionally, select the specific model of the mobile device—this could also be determined based on IMEI; (iii) mount and use a specific mounting fixture to mount the logic board to the CNC machine 130; and (iv) control the CNC machine 130.

The memory 115 can be a hard drive, solid state drive, network, cloud, or any suitable storage medium.

The user interface device 120 can include any and all components for a user to input to, operate, and interface with the CPI removal system that can include a keyboard, a mouse, a touchscreen, an electronic display (i.e., monitor), a barcode scanner, an audio speaker, and any other suitable user interface device.

The CNC machine 130 is a machine tool that cuts or removes material as programmed on the computer 110 or integral controller. For example, the CNC machine 130 can be programmed and operated to remove a memory chip 155 that is located on a logic board 150 using a milling, grinding, or cutting tool 135. Operation of the CNC machine 130 can be controlled via the computer 110. CNC programs for different logic boards and memory chips can be stored in the memory 115 and selected by a user to remove CPI from a particular logic board. Because each mobile device has a different memory chip 155 at a different location on the logic board 150, different programs may be needed for different mobile device models.

The camera 140 can be a digital video camera. The camera 140 can be interfaced to the computer 110. As such, the computer 110 can transmit commands to the camera 140 to turn on, start recording, stop recording, and turn off, etc. While recording, the camera 140 can stream video to the computer 110 to be stored in the memory 115. The recording can be tied to the mobile device in which the logic board 150 was removed.

Although not shown, the CNC machine 130 can be located in a cabinet or enclosure. The cabinet can include the CNC machine 130, a dust collection system (i.e., a vacuum), a mounting fixture to mount the logic board 150, the camera 140, a lockable safety door to prevent access to the CNC machine 130 while it is in operation, a door sensor to detect if the door is open. Because each mobile device has a unique shape for the logic board 150, different mounting plates may be needed for different mobile device models.

A software application run on the computer 110 can be programmed to perform the following tasks: (i) detect whether the cabinet door is open or closed prior to starting the CNC machine 130; (ii) activate and deactivate the safety door lock; (iii) start and stop the camera 140 from video recording; (iv) configure the CNC machine 130 based on the specific model of the mobile device/logic board; (v) start and stop the CNC grinding/milling process; (vi) upload the video recording to a storage location; and (vii) update a database with a record associated with the mobile device, status of the CPI removal operation, and location of the video recording of the CPI removal operation.

Figure 2:
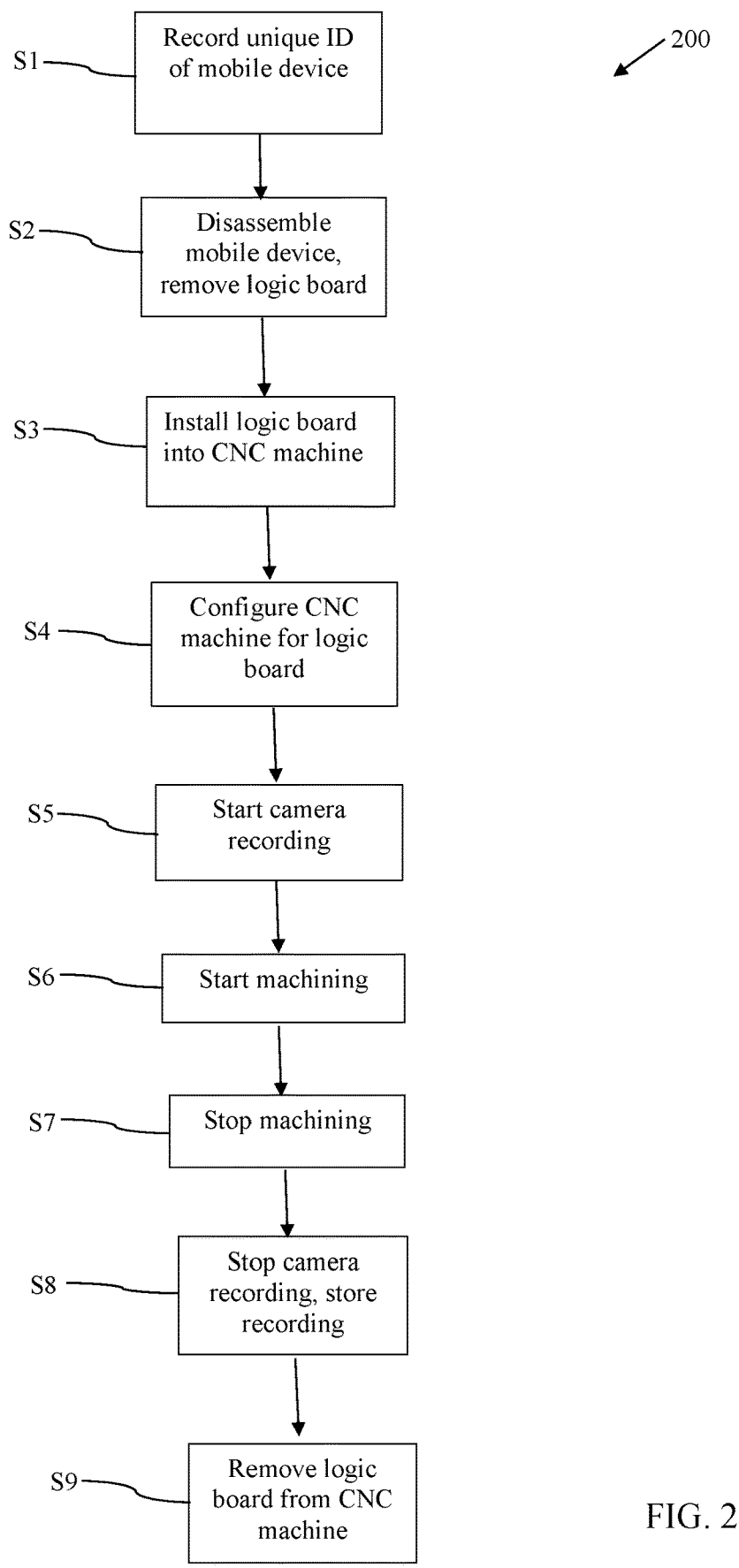
FIG. 2 is a flow chart of a method according to an embodiment of the present disclosure.

FIG. 2 is a flowchart of steps in a method of a CPI removal operation 200 according to an embodiment of the present disclosure. The method 200 permanently removes the CPI from the logic board of a mobile device with traceability by physically destroying the memory chip in which the CPI was stored and associating a unique identifier of the mobile device to a video recording of the destruction of the memory chip. The method 200 can be performed on a mobile device in which the CPI cannot be erased through other means due to the mobile device being non-functional or any other reason.

In step S1, after it has been determined that a mobile device is a candidate for the method 200, a unique identifier (i.e., the IMEI, serial number, etc.) of the mobile device is recorded. The unique identifier can be entered into a log, keyed into a computer program, captured as a camera image and stored in a computer memory, scanned into a computer program, or recorded by any suitable means.

In step S2, the mobile device is disassembled and the logic board of the mobile device is removed.

In step S3, the logic board is mounted to a CNC machine. For example, the logic board can be mounted into a mounting fixture and the mounting fixture then mounted to the CNC machine. If the CNC machine includes an enclosure with a safety door, this step can include closing the safety door after the mounting fixture is mounted to the CNC machine.

In step S4, the CNC machine is configured to run a program to remove, by milling away, the memory chip on the logic board. Programs can be previously developed and stored in a computer or CNC controller, for example, for different logic boards and mounting fixtures. Program information for various logic boards can indicate the precise location and dimension of the memory chip. The program associated with the logic board can be selected by an operator from a memory storage or database or determined based on the unique identifier of the mobile device. As new mobile devices/logic boards are introduced, new mounting fixtures and CNC programs/configurations must be created to integrate into the process. The CNC program can be written in such a way that programs for new devices can be created by providing position and dimension information in a configuration file, without requiring a new program to be written from scratch. Optionally, the CNC machine can include an automated system using some form of artificial intelligence and sensing system to locate and remove the memory chip from the logic board.

In step S5, the camera is started to record the CPI removal. In step S6, the CNC machine starts the operation of milling away the memory chip from the logic board. The camera records the CNC operation of milling away the memory chip from the logic board. In step S7, the CNC completes the milling operation and the CNC machine is stopped. In step S8, recording by the camera is stopped and video file is saved in memory. The memory can be part of a computer, the CNC machine, a network, or any suitable storage location. For traceability purposes, a record can be created in a database that connects the storage location of the video file to the unique device identifier of the mobile device.

In step S9, the logic board is removed from the CNC machine. At this point, the memory chip on the logic board has been physically removed and the logic board is now free of any CPI. Video evidence of the memory chip removal operation has been saved and a traceable record of the CPI removal from the mobile device has been generated. All other components on the logic board are intact and can be salvaged or reused for other purposes.

As described above, all or some of the steps in a method can be automated such that a non-transient, computer-readable storage medium includes computer-executable instructions stored tangibly thereon where the instructions when executed causing a processor to perform the operations or steps.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system comprising:
   a computer;

an input device to input to the computer a unique identifier associated with a board;

a computer numerical control (CNC) machine controlled by the computer and configured to physically remove a predetermined chip from the board;

a camera to record the CNC machine physically removing the predetermined chip from the board; and a memory to store a first file comprising the camera's recording and to store a second file comprising a record associating the unique identifier associated with the board to the camera's recording.

2. The system of claim 1, wherein the input device is a bar code scanner.

3. The system of claim 1, wherein the unique identifier is of a mobile device and the board is from the mobile device.

4. The system of claim 1, wherein the unique identifier is an International Mobile Equipment Identity (IMEI) number of a mobile device.

5. The system of claim 1, wherein the chip is a memory chip.

6. The system of claim 1, wherein the chip has stored customer personal information.

\* \* \* \* \*